2,759,844

ULTRAMARINE PIGMENT AND METHOD OF MAKING SAME

Charles A. Kumins, Tuckahoe, N. Y., assignor to Interchemical Corporation, New York, N. Y., a corporation of Ohio No Drawing. Application April 26, 1951,
Serial No. 223,149

9 Claims. (Cl. 106—305)

This invention relates to new selenium ultramarine pigments and aims to provide a new and economical method for their production.

Selenium ultramarine is a selenium containing sodium aluminum silicate having a crystal structure closely resembling that of the zeolites. The brown to bluish-brown color is attributed to the presence of selenium complexes in the crystal lattice. It can be used as a pigment in paints, inks, paper, etc.

It has now been discovered that selenium ultramarine can be commercially prepared by mixing a zeolite or a compound or mixture of compounds yielding a zeolite under reaction conditions, with selenium and an organic alkali metal compound. As organic alkali metal compounds there can be used alkali metal salts of carboxylic acids, such as sodium citrate, sodium oxalate, sodium acetate, and sodium propionate. While organic salts having a relatively high carbon to sodium ratio, such as the soaps, are also useful, they require additional amounts of selenium to carry away the excess carbon as carbon diselenide. Also, alkali metal alcoholates, such as sodium methoxide, sodium ethoxide, and sodium phenylate can be used. In addition, cyclic alkali metal compounds can be used in like manner, such as the sulfanilate, benzoate, 1,2-dihydroxyanthraquinone, sodium sulfonate, naphthionate, sodium-N-chloro-toluene-sulfonamide, cinnamate, hippurate, benzyl succinate, and p-(p-dimethylamino-phenylazo)benzoate. While the sodium compounds are preferable because of ready availability and lower cost, the corresponding alkali and alkaline-earth metal compounds can be used in their place. Again, such compounds having a relatively high carbon to sodium ratio require additional amounts of selenium to carry away the excess carbon.

The reaction mixture is heated with exclusion of air at temperatures above 600° C., preferably from 750° C. to 900° C., for a period of 20 minutes to 3 hours. This period is not critical, but a definite time period of moderate duration is required. The product obtained at this point, unoxidized or primary selenium ultramarine, is a new and useful, transparent, brown pigment.

Thereafter, to obtain selenium ultramarine, I continue the heating under oxidizing conditions either by the admission of air or an oxidizing gas, such as sulfur dioxide or nitric oxide or both. The temperature may be held as high as during the first stage or it can be dropped to a lower temperature even as low as 500° C. although best results are obtained in the range of 500° C. to 800° C. Oxidation is continued for 30 minutes to 3 hours and the resultant product, which is maroon in color, is then cooled, either slowly or by quenching.

It is my belief that the use of organic alkali metal compounds avoids excessive alkalinity at all stages of the reaction, such as occurs when sodium carbonate is used. The organic alkali metal compound decomposes below the boiling point of selenium and during the decomposition the alkali metal combines with the selenium to form extremely small alkali metal polyselenide particles in intimate association with the zeolite. The complete absence of caustic alkali entirely avoids fusion. My product, as discharged from the calcining furnace or kiln, is a fine powder which consists of small aggregates, and upon washing free of water-soluble salts can be immediately discharged into a wet milling system without prior crushing.

My calcination process can be carried out in various ways and in various types of equipment. I can employ covered crucibles in muffle furnaces, I can spread the material on the floor of a muffle furnace, or I can use a batch rotary kiln or continuous type rotary kilns. If desired, the primary product can be quenched in water, washed and dried before the oxidation calcination, or it can be oxidized without removing from the furnace.

As indicated, one of my starting materials is a zeolite. This may be a natural zeolite but I prefer to control the quality of the finished product by the employment of a synthetic zeolite as indicated in some of the examples that follow later. Equivalent results may be obtained by the use of other reagents yielding zeolites under the high temperature employed in the reaction process. Thus, I have produced useful selenium ultramarine pigment from mixtures of sodium aluminate and silica or china clay. In the latter case, especially good results are had by first calcining the clay and then digesting it with caustic.

A further feature of my invention is the addition of a small amount of a polar-non-polar compound, such as sodium resinate, the sodium salt of lignin sulfonic acid or a soap, during the mixing of the zeolite, selenium and organic alkali metal compound. This small addition of resinous material or soap prevents packing and also facilitates obtaining a uniform mixture of the ingredients. Besides its function of promoting mixing, this addition agent may be treated as part of the organic salt. However, if more than a few percent are added, the amount of carbon supplied compared with sodium will be excessive and additional selenium must then be supplied sufficient to combine with the carbon to form carbon selenide which readily passes out of the reaction zone.

My new primary and secondary selenium ultramarine products are characterized by fine particles of uniform color, easy grinding in paint, lacquer and ink vehicles, and transparent brown to purple color.

Example 1 gives a method for preparing artificial zeolite.

The remaining examples give methods for preparing selenium ultramarine, both primary and secondary.

Example 1

A solution of 2,500 gms. of "N grade" sodium silicate, containing 720 gms. of silica ($SiO_2$) in 8,350 cc. of water at 60° C., is slowly added to a solution of 750 gms. of 90% sodium aluminate ($Na_2Al_2O_4$) in 8,350 cc. of water, also at 60° C., while stirring continuously. The resulting zeolite is filtered, washed substantially free of sodium hydroxide and dried at 110° C.

Example 2

530 gms. of the zeolite of Example 1, 153 gms. of anhydrous sodium acetate, 295 gms. of selenium and 30 gms. of sodium lignin sulfonate were ball-milled overnight, and then charged into a muffle furnace at a temperature of about 500° C. The temperature was raised to about 900° C., while excluding air, and maintained at about 900° C. for 2 hours. The evolved selenium was collected for re-use. The calcined product was discharged into water, washed substantially free of water soluble salts, wet-milled in a porcelain ball mill, filtered, washed and dried. A soft, brownish-red pigment was obtained. The substitution of an equivalent amount of 1,2-dihydroxyanthraquinone sodium sulfonate, based on sodium content gives equivalent results when 20% addition selenium is used to take care of the additional carbon of the anthraquinone compound.

Example 3

The reduction calcination step of Example 2 was repeated, the temperature was allowed to drop to about 500° C., and sulfur dioxide was introduced for 3 hours while the temperature was held at 500° C. The calcined selenium ultramarine product was discharged into water, washed by decantation until substantially free of water-soluble salts, wet-milled in a porcelain ball mill, filtered, washed and dried. A dark-brown pigment was obtained. Nitric oxide can be used in place of sulfur dioxide.

Eaxmple 4

50 gms. of selenium 206 gms. of Celite #110, 92% silica, 255 gms. of sodium aluminate, 90% $Na_2Al_2O_4$, 150 gms. of anhydrous sodium acetate, and 40 gms. of sodium stearate were ball-milled overnight, then charged into a muffle furnace at a temperature of about 500° C. The temperature was raised to about 900° C. and calcined at that temperature while excluding air for 1¼ hours. The resulting product was a soft brown pigment, which, on further calcination for 3 hours at about 500° C. with the introduction of a mixture of about 70% sulfur dioxide and 30% air, became a maroon pigment. The substitution of 42.5 gms. of sodium resinate for the sodium stearate, and 293 gms. of sodium salicylate for the sodium acetate gives exactly similar results when 20% additional selenium is used to make up for the added carbon content of the sodium salicylate.

Example 5

300 gms. of selenium, 300gms. of anhydrous sodium acetate, 10 gms. of sodium lignin sulfonate, 510 gms. of calcined, causticized clay, and 300 gms. of Celite #110 were ball-milled overnight, then processed according to the method of Example 4. A maroon colored pigment was obtained. Sodium naphthionate, sodium sulfanilate, or sodium-N-chlorotoluene-sulfonamide may be substituted in an amount equivalent to the sodium acetate, based on sodium content, to give equivalent results, in which cases 20% additional selenium is required.

Example 6

300 gms. of powdered selenium, 450 gms. of kaolin, 300 gms. of sodium carbonate, 250 gms. of sodium formate and 10 gms. of sodium stearate were ball-milled for about 2 hours, then calcined according to the method of Example 4. The resulting product was a transparent brownish red pigment. The substitution of an equivalent amount of sodium cinnamate or lithium hippurate for the sodium formate, based on sodium content, gives similar results, in which case 20% additional selenium is required.

Example 7

When the reduction calcination product of Example 1 is thereafter oxidized with $SO_2$ at 800° C. for 1 hour, a bluish red pigment is obtained.

What is claimed is:

1. Method of producing selenium ultramarine which comprises heating, at a temperature of the order of 500° to 900° C. for twenty minutes to three hours, a mixture, in proportions sufficient to produce selenium ultramarine, containing selenium, an organic alkali metal compound, and a member of the group consisting of zeolites and mixtures which form zeolites under the reaction conditions, with the exclusion of air.

2. Method of producing selenium ultramarine which comprises heating, at a temperature of the order of 500° to 900° C. for twenty minutes to three hours, a mixture, in proportions sufficient to produce selenium ultramarine, containing selenium, an organic alkali metal compound, and a member of the group consisting of zeolites and mixtures which form zeolites under reaction conditions, with the exclusion of air, changing the ambient atmosphere to oxidizing conditions at a temperature of the order of 450° to 800° C. for one-half to three hours, and cooling, washing and grinding the resultant product.

3. Method of producing selenium ultramarine which comprises heating, at a temperature of the order of 600° to 900° C. for twenty minutes to three hours, a mixture, in proportions sufficient to produce selenium ultramarine, containing selenium, an organic alkali metal compound, and a member of the group consisting of zeolites and mixtures which form zeolites under reaction conditions, changing the ambient atmosphere to oxidizing conditions, and continuing the heating under oxidizing conditions and in the presence of a member of the group consisting of oxides of sulfur and nitric oxide at a temperature between 450° and 800° C. for one-half to three hours, and cooling the resultant product.

4. The improvement in the process of producing selenium ultramarine which comprises intimately mixing in proportions sufficient to produce selenium ultramarine, an organic alkali metal compound, selenium, a member of the group consisting of zeolites and mixtures which form zeolites under reaction conditions, and up to 5% of a polar-non-polar compound selected from the group consisting of alkali metal resinates, alkali metal soaps, and alkali metal salts of a lignin sulfonic acid, heating said mixture in a reducing atmosphere at a temperature of the order of 500° to 900° C. for twenty minutes to three hours and changing the ambient atmosphere to oxidizing conditions at a temperature of 450° to 800° C. for one-half to three hours.

5. The improvement in the process of producing selenium ultramarine which comprises intimately mixing in proportions sufficient to produce selenium ultramarine, an organic alkali metal compound, selenium, a member of the group consisting of zeolites and mixtures which form zeolites under reaction conditions, and up to 5% of a polar-non-polar compound selected from the group consisting of alkali metal resinates, alkali metal soaps, and alkali metal salts of a lignin sulfonic acid, and heating said mixture in a reducing atmosphere at a temperature of the order of 500° to 900° C. for twenty minutes to three hours.

6. Process according to claim 5, wherein the polar-non-polar compound is sodium lignin sulfonic acid.

7. Process according to claim 5, wherein the polar-non-polar compound is sodium resinate.

8. Primary selenium ultramarine produced by heating, at a temperature of the order of 500° to 900° C. for twenty minutes to three hours, a mixture, in proportions sufficient to produce selenium ultramarine, containing selenium, an organic alkali metal compound, and a member of the group consisting of zeolites and mixtures which form zeolites under reaction conditions, with the exclusion of air, and cooling, washing and grinding the resultant product.

9. Selenium ultramarine produced by heating, at a temperature of the order of 500° to 900° C. for twenty minutes to three hours, a mixture, in proportions sufficient to produce selenium ultramarine, containing selenium, an organic alkali metal compound, and a member of the group consisting of zeolites and mixtures which form zeolites under reaction conditions with the exclusion of air, changing the ambient atmosphere to oxidizing conditions at a temperature of the order of 450° to 800° C. for one-half to three hours, and cooling, washing and grinding the resultant product.

References Cited in the file of this patent

UNITED STATES PATENTS

| | | |
|---|---|---|
| 2,441,951 | Beardsley et al. | May 25, 1948 |
| 2,441,952 | Beardsley et al. | May 25, 1948 |
| 2,482,006 | Kertesz | Sept. 13, 1949 |
| 2,535,057 | Gessler et al. | Dec. 26, 1950 |
| 2,544,694 | Kumins | Mar. 13, 1951 |
| 2,544,695 | Kumins | Mar. 13, 1951 |

OTHER REFERENCES

"Selenium and Tellurium," Journal of Industrial and Engineering Chemistry, vol. 12, No. 6, page 597, June 1920. (Copy in Div. 64.)